(No Model.)
E. C. WESTON.
COUNTER SHAFT AND BELT TIGHTENER.
No. 573,191. Patented Dec. 15, 1896.
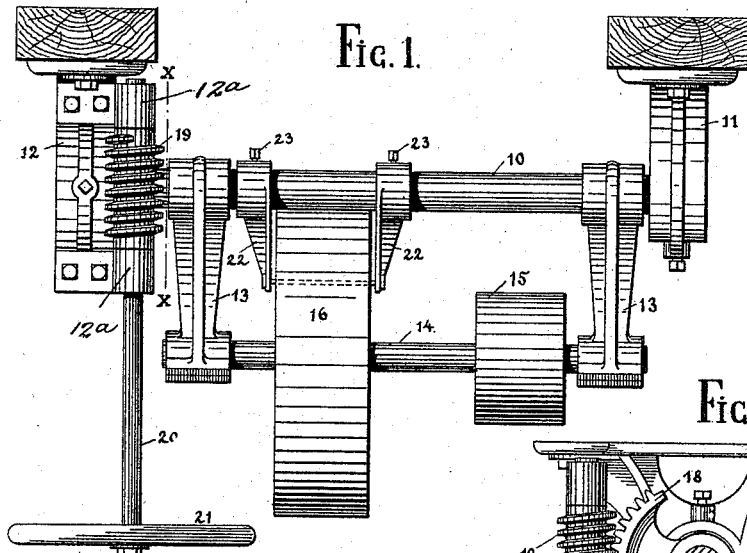
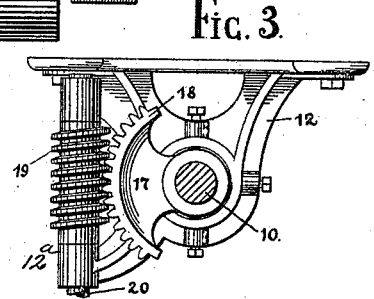
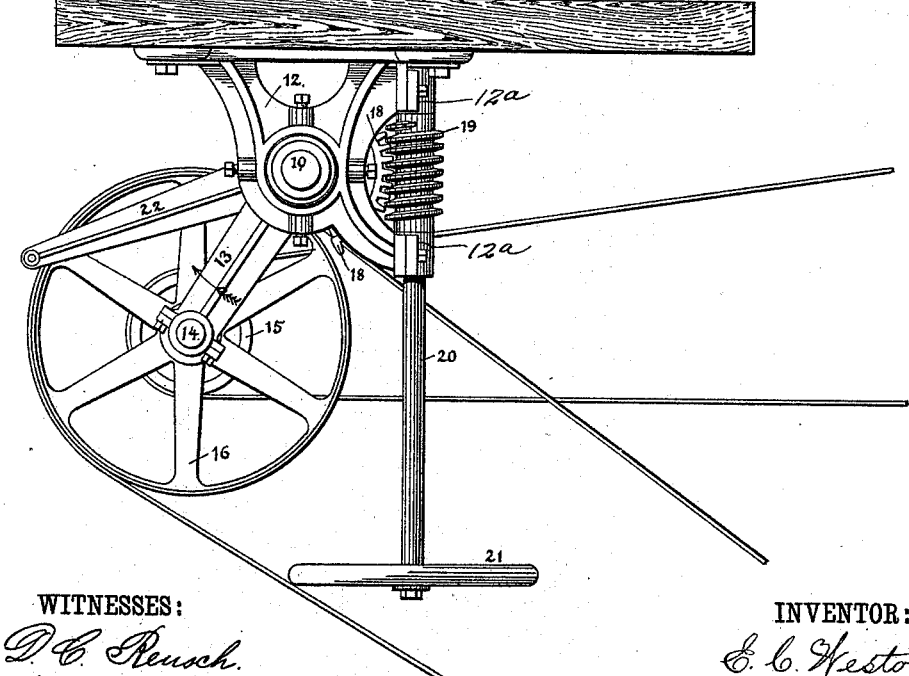
WITNESSES:
D. C. Reusch.
M. Hanaford
INVENTOR:
E. C. Weston.
BY
ATTORNEYS.

UNITED STATES PATENT OFFICE.

EUGENE C. WESTON, OF GALLATIN, MISSOURI.

COUNTER-SHAFT AND BELT-TIGHTENER.

SPECIFICATION forming part of Letters Patent No. 573,191, dated December 15, 1896.

Application filed February 10, 1896. Serial No. 578,772. (No model.)

*To all whom it may concern:*

Be it known that I, EUGENE CLAYTON WESTON, of Gallatin, in the county of Daviess and State of Missouri, have invented a new and Improved Counter-Shaft and Belt-Tightener, of which the following is a full, clear, and exact description.

This invention relates to a novel form of counter-shaft and belt-tightener, the object of the invention being to dispense with the use of loose pulleys and to so mount a counter-shaft that it may be moved to a position so that the belts running in connection with the pulleys carried thereby will run slack upon said pulleys, whereby a material saving of time and expense is effected, all as will be hereinafter more fully described, and specifically pointed out in the claims.

Reference is to be had to the accompanying drawings, forming a part of this specification, in which similar figures of reference indicate corresponding parts in all the views.

Figure 1 is a front view of my improved form of counter-shaft and belt-tightener, the belts, however, not being shown in position. Fig. 2 is a side view of the device, and Fig. 3 is a sectional view taken on line $x\,x$ of Fig. 1.

In the drawings, 10 represents an independent shaft which is mounted in hanger-bearings 11 and 12. To this shaft 10 there are rigidly connected two hanger-arms 13, which serve as the supports and bearings for a counter-shaft 14, said counter-shaft being provided with two fixed pulleys 15 and 16. The shaft 10 also carries a rigidly-connected arm 17, upon which there is formed a segmental gear 18, and this gear 18 is engaged by a worm 19, that is carried by a vertical shaft 20, said shaft being supported by the hanger 12 through the medium of bearings 12ª, held thereon, and being provided with a hand-wheel 21.

Belt-guides 22 are arranged in connection with the pulley 16, and, if desired, such guides might be arranged in connection with the pulley 15, said belt-guides being carried by the shaft 10, to which they are held by set-screws 23.

From the construction described it will be seen that if the shaft 20 be turned so as to move the segmental gear 18 downward the shaft 10 will be turned in its bearings and the counter-shaft 14 will be carried upward in the direction of the arrow shown in Fig. 2, thus tightening the belts that are running in connection with the pulleys carried by said counter-shaft, and it will be readily understood that any degree of tightness required may be imparted to the said belts. When it is desired to throw the shaft 14 out of action, the shaft 20 is turned so that the counter-shaft and the parts carried thereby will be moved downward, thus slacking and throwing the belts out of action. That the wear and tear upon the belts will be greatly diminished is a fact that will be readily appreciated by those skilled in the art.

Having thus fully described my invention, I claim as new and desire to secure by Letters Patent—

1. The combination of bearings, a rock-shaft mounted in the bearings, arms fixed to the rock-shaft, a counter-shaft revolubly mounted in the arms, a pulley carried by the counter-shaft, a belt passing around the pulley, a toothed sector fixed to the rock-shaft, a worm meshing with the toothed sector, and bearings for the worm, the bearings being supported by one of the bearings for the rock-shaft, substantially as described.

2. The combination of two hanger-bearings, one of which is formed with two supplemental bearings, the line of which is at right angles to the line of the main bearing, a rock-shaft journaled in the hanger-bearings, arms fixed to the rock-shaft, a counter-shaft carried by the arms, a pulley carried by the counter-shaft, a belt passing around the pulley, a toothed sector fixed to the rock-shaft, and a worm journaled in the supplemental bearings of one of the hanger-bearings and meshing with the toothed sector, substantially as described.

EUGENE C. WESTON.

Witnesses:
ROLLIN J. BRITTON,
N. G. CRUZEN.